United States Patent [19]

Smith et al.

[11] Patent Number: 5,770,935
[45] Date of Patent: Jun. 23, 1998

[54] DOOR OPENING SYSTEM AND RECEPTACLE

[75] Inventors: Fred P. Smith, Alpine; Robert T. Wells, Jr., Moab, both of Utah

[73] Assignee: Product Innovations & Sales Co, LC, Alpine, Utah

[21] Appl. No.: 680,673

[22] Filed: Jul. 16, 1996

[51] Int. Cl.⁶ .............................. E05F 15/20; B65D 43/24
[52] U.S. Cl. ........................... 318/480; 318/16; 318/286; 49/25; 49/31; 220/211
[58] Field of Search .............................. 318/16, 264, 265, 318/266, 283, 285, 286, 466, 468, 480; 49/25, 31; 414/411, 414; 220/211, 260

[56] References Cited

U.S. PATENT DOCUMENTS

| | | |
|---|---|---|
| 3,504,729 | 4/1970 | Alton . |
| 3,852,592 | 12/1974 | Scoville et al. . |
| 3,891,115 | 6/1975 | Ono . |
| 4,207,466 | 6/1980 | Drage et al. . |
| 4,552,061 | 11/1985 | Brutsman . |
| 4,729,490 | 3/1988 | Ziegenbein . |
| 4,851,746 | 7/1989 | Milke . |
| 4,888,532 | 12/1989 | Josson . |
| 4,894,952 | 1/1990 | Trett et al. . |
| 4,996,467 | 2/1991 | Day . |
| 5,040,331 | 8/1991 | Merendino et al. . |
| 5,181,018 | 1/1993 | Cowie et al. . |
| 5,329,212 | 7/1994 | Feigleson . |

Primary Examiner—Bentsu Ro
Attorney, Agent, or Firm—Parson & Goltry; Robert A. Parsons; Michael W. Goltry

[57] ABSTRACT

A receptacle comprising a body including an opening having a door hingedly mounted therein for movement between a normal and substantially vertical orientation and a substantially horizontal orientation, a drive assembly having a hub for taking up and letting out the cord for moving the door between the substantially vertical orientation and the substantially horizontal orientation, and an actuator device for actuating the drive assembly, the hub being spaced apart from said hinge proximate an optimum position for minimizing the amount of force necessary for the drive assembly to move the door.

36 Claims, 4 Drawing Sheets

DOOR OPENING SYSTEM AND RECEPTACLE

BACKGROUND OF THE INVENTION

1. Field of the Invention

This invention relates to door opening systems.

More particularly, this invention relates to automated door opening systems.

In a further and more specific aspect, the instant invention relates to a receptacle having an automated door opening system.

2. Prior Art

There are many devices having a container with a door mounted within the opening that is biased to conceal or close the opening. Such a door may be biased to conceal the opening by means of gravity, springs, counterbalance weights, or other biasing means. Many times it is desirable for the door to open without any assistance from the user.

In order to accommodate this need, the prior art has provided many varieties of automatic door openers. For instance, mechanisms for automatically opening doors are available for use in combination with garage doors, doors used in doorways of domestic and commercial buildings, and trash or waste receptacles. Many of the waste receptacles used in fast food restaurants, commercial buildings, theaters, malls, and other such places, incorporate containers having lids or covers with openings through which trash is received. Normally, a trash can is retained within the waste receptacle for receiving the trash which may be removed through a access panel when full. Some waste receptacles incorporate a door which is pivotally mounted within the opening. The door is operative for concealing not only the trash retained therein, but also the unpleasant smells that normally emanate from trash and rubbish.

Normally, the doors used in combination with waste receptacles pivot inwardly. Thus, to gain access to the interior of the waste receptacle to dispose of waste therein, a user must first pivot the door inwardly to access the opening. With the door held inwardly, a user can then dispose of waste through the opening for receipt into the receptacle. Normally a user must use his or her hand, a tray, or some other item to keep the door held inwardly in order to distribute waste through the opening. This can be terribly inconvenient, and as a result, the prior art has devised a number of devices for facilitating the automatic opening of the door so that a user need not manually hold the door open.

Most of the prior art devices incorporate a motor for actuating a take-up spool or rotor. For instance, one such device incorporates a container for holding waste having on opening and a door movably mounted within the opening. This device also includes a stepping motor mounted on the container, and a sensor for sensing a user presented before the container. A rope is also provided having an end coupled to the door and an end coupled to a rotor which is coupled to the motor, the motor for imparting rotation to the rotor when the motor is actuated. When the sensor senses the user, the motor is actuated which rotates the rotor and winds up the rope which pivots the door inwardly thereby allowing one to access the opening. Although this apparatus is exemplary, due to the position of the rotor relative to the door, the motor must have a relatively high torque output in order to open the door. As a result, the apparatus is not energy efficient. Furthermore, due to the relatively high degree of torque the motor must possess in order to actuate the door, fingers of a user accidentally left in the door during actuation of the door can become smashed or severely damaged.

Another known device incorporates a waste receptacle having a door that automatically opens when a user is presented before it, and that automatically closes when the user departs therefrom. In particular, this devices includes an infrared proximity sensor for detecting the presence of the user within a specified proximity of the waste receptacle. Upon detecting the presence of a user, an electric motor actuates, imparting motion to an actuator arm. The actuator arm pivots, thereby pulling a flexible cable attached to the door which opens the door. Although this device is also exemplary, use of the actuator arm is extremely inefficient because the motor torque necessary to actuate the arm to open the door is quite high which is not energy efficient, and which can further lead to personal injury if a hand or fingers are left within the proximity of the door during operation. Furthermore, this device does not open the door very far, which makes it difficult to access the opening when trying to dispose of large waste items. Furthermore, like all other prior art devices, the distance from the door opening to the rear of the motor is relatively large; therefore, the container must be deep in order to install the motor.

It would be highly advantageous, therefore, to remedy the foregoing and other deficiencies inherent in the prior art.

Accordingly, it is an object of the present invention to provide a new and improved door opening system.

Another object of the present invention is to provide a new and improved waste receptacle having the door opening system.

And another object of the present invention is to provide a door opening system that is inexpensive to manufacture.

Still another object of the present invention is to provide a door opening system that is safe.

Yet another object of the instant invention is to provide a door opening system that is energy efficient.

Yet still another object of the instant invention is to provide a door opening system that will open a door completely out of the way of the opening thereby allowing unimpeded access to the opening.

And a further object of the invention is to provide a door opening system that regulates the speed at which the door opens and closes.

Still a further object of the immediate invention is to provide a door opening system that incorporates safeguards for inhibiting personal injury.

Yet a further object of the invention is to provide a door opening system that is easy to install.

And still a further object of the invention is to provide a waste receptacle that is easy and inexpensive to construct.

And yet another object of the invention is to provide a sensor immune to false signals.

And yet still another object of the invention is to provide a short mounting distance from the door opening to the rear of the actuating device.

SUMMARY OF THE INVENTION

Briefly, to achieve the desired objects of the instant invention in accordance with a preferred embodiment thereof, provided is a receptacle having a door opening system. The receptacle includes a body having an opening with a door hingedly mounted therein. The door is movable between a normal and substantially vertical orientation and a substantially horizontal orientation. The door opening system includes an actuator device for actuating a drive assembly for taking up and letting out the cord. With respect to the preferred embodiment, the actuating device includes a filter means for sensing an object proximate the door. The drive assembly actuates in response to the filter means for moving the door between the substantially vertical orientation and the substantially horizontal orientation. The drive assembly includes a hub for taking up and letting out the cord, the hub being spaced apart from said hinge proximate an optimum position for minimizing the amount of force, in the form of torque, necessary for the drive assembly to generate in order to facilitate movement of the door from the substantially vertical orientation to the substantially horizontal orientation.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which.

DETAILED DESCRIPTION OF THE PREFERRED EMBODIMENT

Figure 1:
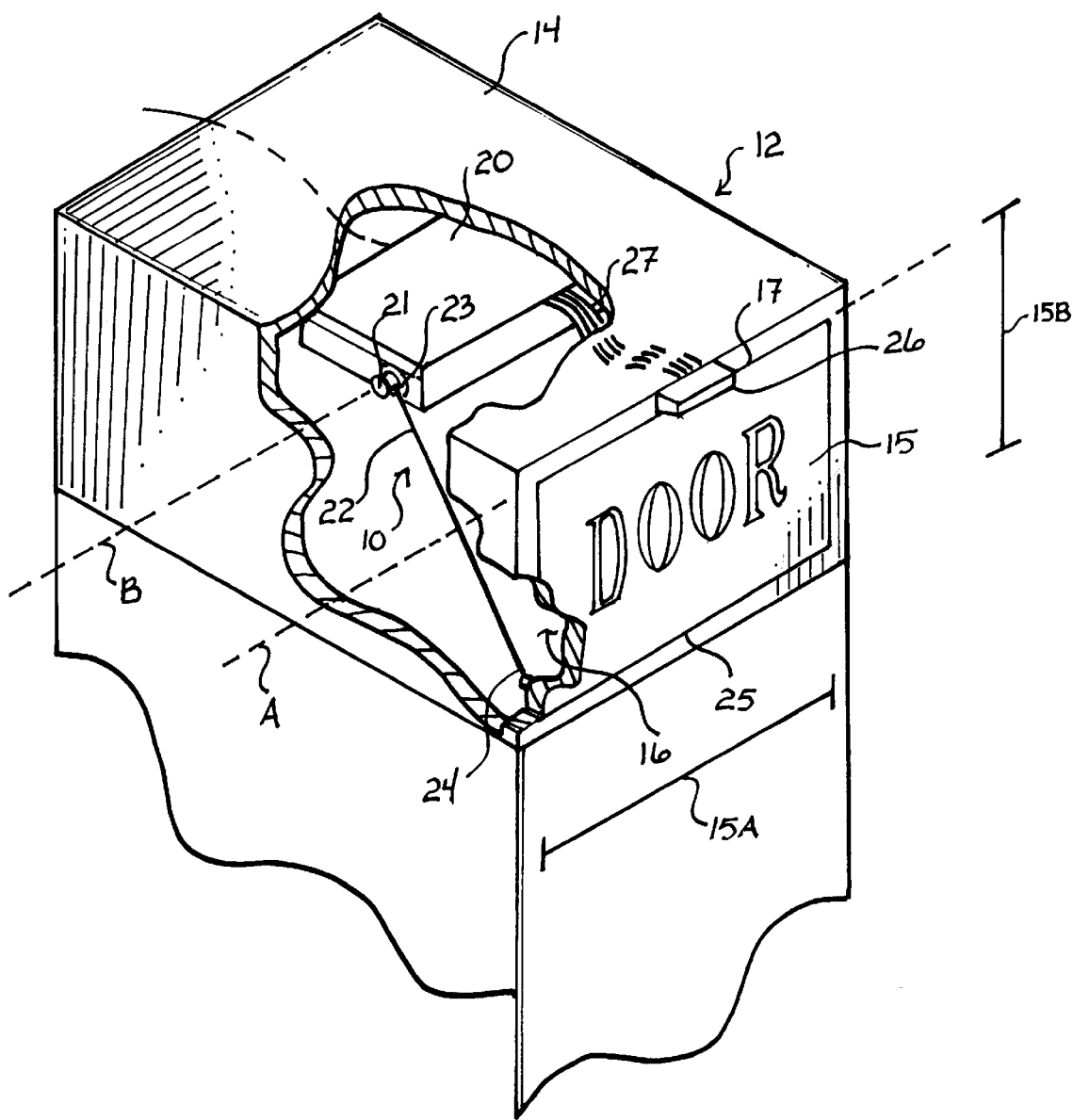
FIG. 1 is a perspective view of an embodiment of the instant invention comprising an automatic door opening system shown as it would appear in combination with a waste receptacle, the door further being shown in a closed or substantially vertical orientation.

Turning now to the drawings, in which like reference characters indicate corresponding elements throughout the several views, attention is first directed to FIG. 1 which illustrates a first embodiment of the instant invention comprising a door opening system 10 shown as it would appear in combination with a waste receptacle 12. Although door opening system 10 is shown in combination with waste receptacle 12, it will be understood that door opening system 10 may be employed in other applications consistent with the spirit of the instant invention as herein disclosed. However, with respect to the instant application, receptacle 12 includes a body 14 having a door 15 pivotally mounted within opening 16 through which waste may be passed for depositing within receptacle 12. With momentary reference to FIG. 2, door 15 is pivotally mounted within opening 16 proximate an upper edge 17 thereof. Door 15, having a selected width 15A and a selected height 15B, and which is normally disposed in a substantially vertical orientation as shown in FIG. 1 resulting from gravitational effects, is pivotally movable along axis of rotation A inwardly between the substantially vertical orientation and a substantially horizontal orientation and back again for allowing a user to selectively access opening 16, which can be seen in FIG. 2. Door opening system 10 provides a convenient means of automatically opening door 15 when a user is presented within a specified proximity of receptacle 12. Furthermore, when door 15 is disposed in the substantially horizontal orientation, door 15 is substantially completely out of the way of opening 16 thereby facilitating unimpeded access to opening 16 for depositing waste therethrough.

Figure 2:
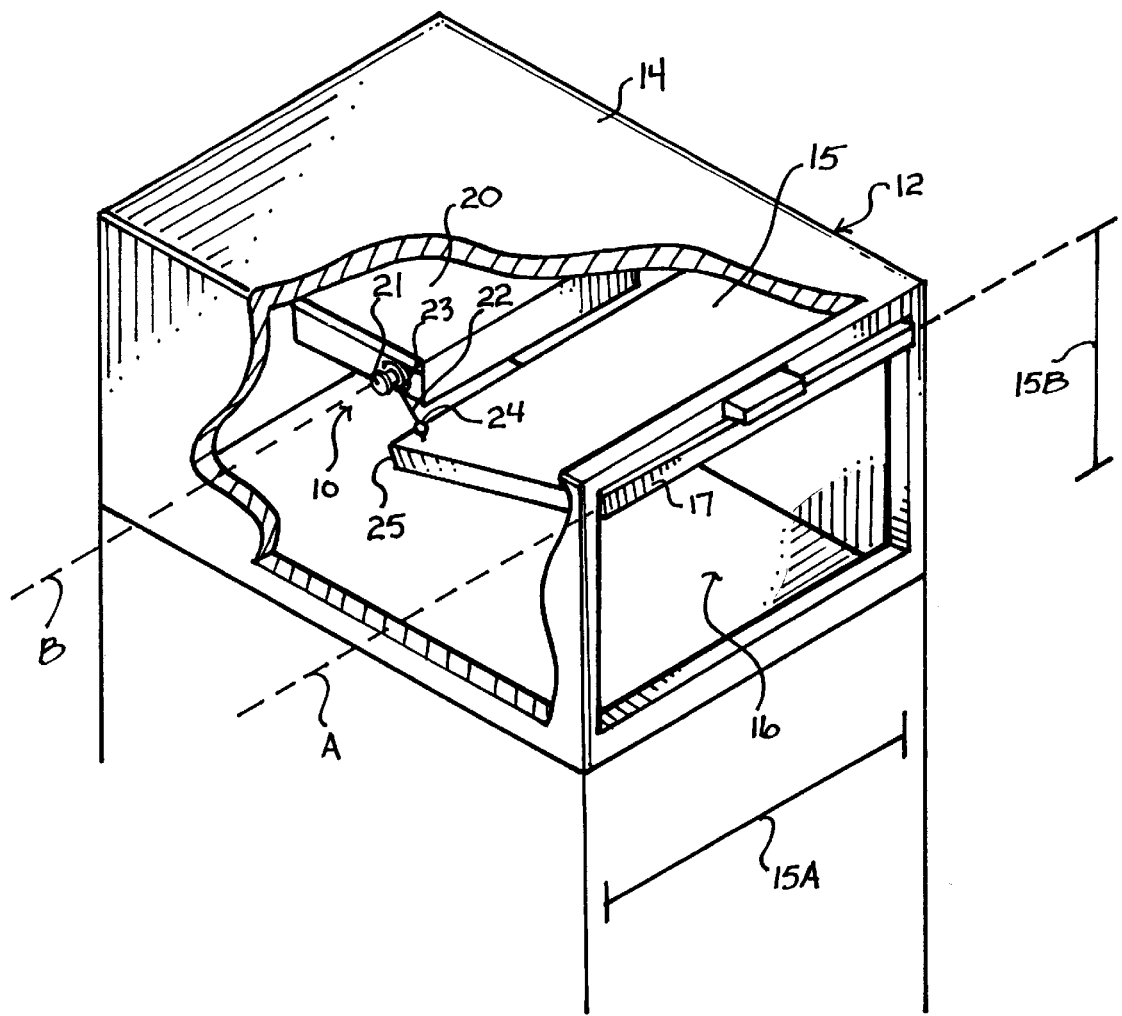
FIG. 2 is a perspective view very similar to the view of FIG. 1, with the door shown in an open or substantially horizontal orientation.

With continuing reference to FIG. 1 and FIG. 2, door opening system 10 includes a housing 20 carried within and substantially concealed by receptacle 12 positioned inwardly and substantially directly laterally spaced apart from upper edge 17 of door 15. Extending from the housing is a take up attachment shown as a hub 21. A cord 22 is also provided having an end 23 coupled to hub 21 and another end 24 coupled proximate a lower edge 25 of door 15. Further included is an emitter/receiver 26, which, as can be seen in FIG. 1, is coupled to housing 20 via electrical interconnection 27 Emitter/receiver 26 is mounted on receptacle 12 proximate upper edge 17 of door 15, and is operable for facilitating the detection of the presence of a user proximate door 15 for providing actuation door 15, further details of which will be discussed as the detailed description ensues.

Figure 3:
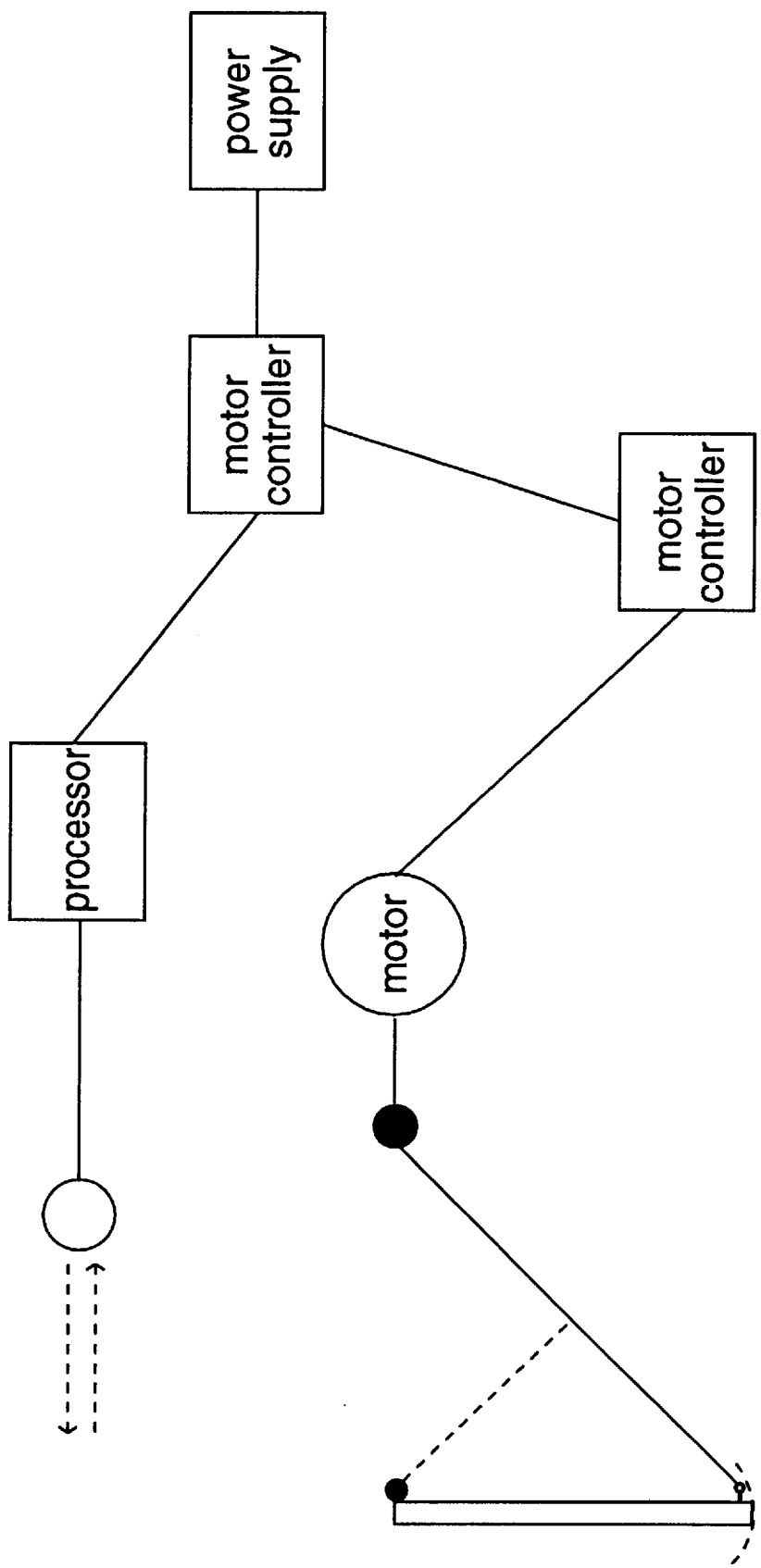
FIG. 3 is a block diagram of the electronic components of the instant invention.
Figure 4:
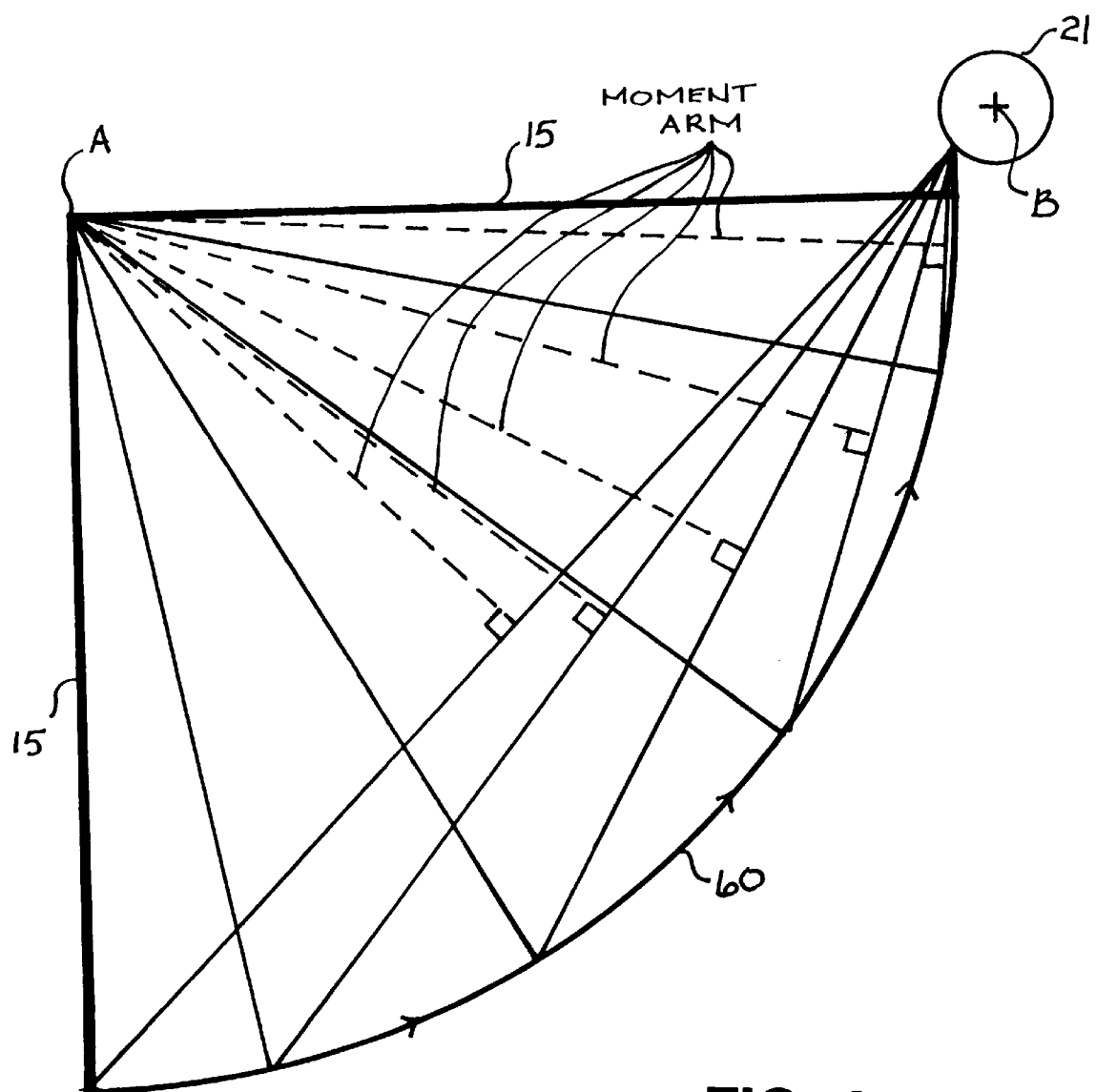
FIG. 4 is a graphic representation of the movement of the door from the closed or substantially vertical orientation to the open or substantially horizontal orientation.

Attention is now directed to FIG. 3 which illustrates a preferred embodiment of a drive assembly 30 for actuating door 15. As illustrated, drive assembly 30 includes a processor 31, a microcontroller 32, a power supply 33, a motor controller 34, a motor 35, hub 21 and cord 22. Drive assembly 30 is operative for moving door 15 between its substantially vertical orientation and its substantially horizontal orientation. In operation, emitter/receiver 26, emits a signal, preferably an infrared signal, in the form of an emitted signal 40. When a user is presented proximate door 15, emitted signal 40 impacts the user reflecting emitted signal 40 back to emitter/receiver 26 in the form of a reflected signal 41, which if the conditions are right, will actuate door 15. Reflected signal 41 is received by emitter/receiver 26 and communicated to processor 31 via electrical interconnection 27. Upon receipt of reflected signal 41 from emitter/receiver 26 by processor 31, motor 35 30 is actuated thereby opening door 15, further details of which will be discussed shortly. When motor 35 is actuated, hub 21 rotates along axis of rotation B, either in the clockwise or counterclockwise direction depending on how drive assembly 30 is configured, and cord 22 is taken up as it becomes wound around hub 21. As cord 22 is taken up, door 15 is moved from its normal substantially vertical orientation (FIG. 1) to the substantial horizontal orientation (FIG. 1) to the substantial horizontal orientation (FIG. 2). As can be seen in FIGS. 1–2, axis of rotation B is substantially parallel to axis of rotation A, and defines an optimum position, details of which will be discussed as the detailed description ensues.

It is desirable for inhibiting drive assembly 30 from opening and closing door 15 in an erratic fashion. In this manner, emitted signal 40 is provided in the form of a series of pulse sets, each pulse set having a predetermined number of individual pulses. A predetermined number of pulse sets are emitted over a predetermined period or increment of time, preferably one pulse set three or four times each second. Thus, for each second, emitter/receiver 26 emits thirty or forty pulses in the form of three or four individual pulse sets having ten pulses per set. Objects in front of door 15 will reflect signal 40 back to emitter/receiver 26 as reflected signal 41 previously discussed, reflected signal 41 being in the form of a series of reflected pulse sets. The characteristics of reflected signal 41 are then compared to the characteristics of emitted signal 40 by processor 31. For motor 35 to be actuated, the characteristics of emitted signal 40 must compare in a predetermined fashion, or to a predetermined portion, to the characteristics of reflected signal 41.

In particular, the characteristics of the emitted signal 40 correspond to a predetermined number of pulse sets emitted in a predetermined window of time, each pulse set have a predetermined number of pulses. Each pulse set can have any desired number of pulses, but it is preferred that each pulse set have ten individual pulses. Furthermore, although the pulse sets may be provided throughout a selected predetermined time interval, it is preferred that emitter/receiver 26 emit one pulse set four times per second. The characteristics of reflected signal 41 is directly dependent upon how emitted signal 40 is reflected. In this manner, when an object is presented proximate door 15, emitted signal 40 impacts the object and is reflected back to emitter/receiver 26 in the form of reflected signal 41. Depending on how emitted signal 40 was reflected, reflected signal 41 could be characterized as having exactly ten individual pulses per reflected pulse set, or less than ten individual pulses per reflected pulse set, such as perhaps eight or nine individual pulses. However, processor 31 will actuate drive assembly 30 when the characteristics of reflected signal 41 correspond to a selectively desired portion of the characteristics of emitted signal 41, whether the characteristics of reflected signal 41 be either equal to or less than the characteristics of emitted signal 40.

Accordingly, processor 31 may be configured for actuating drive assembly 30 upon receiving a reflected signal 41 having at least eight individual pulses per emitted signal 40, ten individual pulses per emitted signal 40, or whatever amount is desired, and in whatever preselected quantity over a preselected period of time as desired. Thus, a user may configure processor 31 for actuating drive assembly 30 based on a predetermined and selected comparison of emitted signal 40 to reflected signal 41 for eliminating or inhibiting the erratic actuation of door 15.

It will be understood that any desired number of pulses may be incorporated for each pulse set, such as perhaps five, eight, fifteen, or other desired number of pulses. In addition, any desired and suitable number of pulse sets may be provided over any desired and suitable window of time.

In this manner, after processor 31, in combination with emitter/receiver 26, detects a clean signal, it then sends a signal via electrical interconnection 44 to microcontroller 32, which then sends a signal via electrical interconnection 45 to motor controller 34. Motor controller 34, coupled to motor 35 via electrical interconnection 46, controls the actuation of motor 35 and speed of motor 35 by means of selected inputs. In similar fashion, motor controller 34 sends a signal to motor 35 to actuate motor 35 for imparting rotational motion to hub 21 which then winds up or takes up cord 22 moving door 15 from the substantially vertical orientation to the substantial horizontal orientation for allowing the user to dispose of waste through opening 16 into the interior of receptacle 12. Because door 15 can be disposed in a substantially horizontal orientation, door 15 is virtually completely out of the way of the user so the user may easily pass waste through opening 16 without any interference from door 15.

As long as processor 31 senses reflected signal 41 at predetermined characteristics from emitter/receiver 26 for indicating the presence of a user, door 15 will remain in the substantially horizontal orientation. However, when processor 31 no longer senses reflected signal 41 at predetermined characteristics, processor 31 will cease providing a signal to microcontroller 32. As such, microcontroller 32 then sends a signal to motor controller 34 which then sends a signal to motor 35 turning off motor 35. When motor 35 is turned off, of which operates as a drive means for selectively driving hub 21, hub 21 rotates in the opposite direction from which cord 22 was wound thereby letting out cord 22 for moving door 15 from the substantially horizontal orientation back to the normal substantially vertical orientation.

Power supply 33 is of a conventional variety operable for providing electrical energy to microcontroller 32 via electrical interconnection 47. The electrical energy provided to microcontroller 32 is then channeled to the remaining electrical components. When motor 35 is actuated, electrical energy is flowing from motor controller to motor 35. Similarly, when motor 35 is not actuated, no electrical energy is supplied to motor 35 from motor controller 34. However, motor controller 34 includes a conventional capacitor and a variable resistor, both of which are well known to those having ordinary skill. When electrical energy is turned off by motor controller 34 turning off motor 35, the capacitor and the variable resistor, which have been charged from the passing of electrical energy from motor controller 34 to motor 34, operate together for providing motor 35 with residual electrical energy in the form of progressively decaying energy. In other words, the residual electrical energy stored in the capacitor is channeled through the variable resistor to motor 35 providing motor 35 with energy which decreases over a predetermined period of time. The decaying electrical energy provided to motor 35 from the capacitor and the variable resistor allows motor 35 to actuate hub 21 for controlling the rate at which door moves from the substantially horizontal orientation to the substantial vertical orientation. One may selectively configure the capacitor and the variable resistor for providing electrical energy to motor 35 at a selected rate of decay for controlling the rate at which door 15 moves from the substantially horizontal orientation to the substantial vertical orientation. Although other means may be used, the capacitor and the variable resistor function as a preferred control means for controlling or regulating the rate at which door 15 moves from the substantially horizontal orientation to the substantially vertical orientation when the emitter/receiver 26 no longer senses an object proximate door 15.

As can be seen from FIG. 1, axis of rotation B, which corresponds to hub 21, is positioned laterally inwardly from and somewhat above axis of rotation A of door 15, which corresponds to a hinge 50 used for hingedly mounting door 15 within opening 16. With respect to the preferred embodiment, axis of rotation B is laterally spaced from axis of rotation A a distance substantially equal to height 15B of door 15, of which defines the optimum position of hub 21. As hub 21 takes up cord 22, the moment arm of cord 22 relative the axis of rotation A increases. In this respect, the moment arm of cord 22 relative axis of rotation A is maximized as cord 22 pulls door upwardly along path 60 from the substantially vertical orientation to the substantially horizontal orientation. When door is disposed in the substantially horizontal orientation, the moment arm of cord 22 relative axis of rotation A is at a maximum and substantially equal to the height 15B of door 15, with the angle between cord 22 and door 15 being substantially equal to 90 degrees. Because the moment arm of cord 22 relative axis of rotation A is maximized due to the location of hub 21 proximate the optimum position relative axis of rotation A, motor 35 need only provide a minimum amount of torque in order to move the door. Accordingly, motor 35 may be relatively small having a relatively small torque output, which is advantageous because small motors are inexpensive and do not use a large amount of energy.

Furthermore, because the weight of door 15 in the substantially vertical orientation is virtually negligible at the beginning of the movement of door 15 to the substantially horizontal orientation, the moment arm is minimized because the amount of torque output force necessary to move door from the substantially vertical orientation is also negligible. However, as door 15 travels towards the substantially horizontal orientation, the weight of the door increases which would normally require increasingly more torque output to lift door 15. However, because the moment arm has a corresponding increase along the path from the substantially vertical orientation to the substantially horizontal configuration, the amount of torque output force generated by motor 35 in order to move door 15 from the substantially vertical orientation to the substantial horizontal orientation remains virtually constant, all due to the fact that hub 21 is positioned proximate the optimum position relative axis of rotation A for maximizing the moment arm throughout the movement.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A system for moving a door from a normal substantially vertical orientation to a substantially horizontal orientation, said system comprising:

said door having an upper edge mounted to an axis of rotation;

a drive means for moving said door between said substantially vertical orientation and said substantially horizontal orientation, said drive means being spaced apart from said axis of rotation proximate an optimum position for minimizing the amount of force necessary to move the door from said substantially vertical orientation to said substantially horizontal orientation;

an actuating device for actuating said drive means; and a moment arm of applied force about the axis of rotation, said moment arm being smallest when said door is disposed in said substantially vertical orientation, and continuously increasing as said door moves toward said substantially horizontal orientation.

2. The system of claim 1, wherein said drive means includes a motor having a take-up attachment and a torque output.

3. The system of claim 2, further including a cord having an end coupled to said take-up attachment, and another end coupled proximate a lower edge of said door, said take-up attachment for taking up and letting out said cord for moving said door from said substantially vertical orientation to said substantially horizontal orientation respectively.

4. The system of claim 3, wherein said moment arm is substantially minimized when said door is disposed in said substantially vertical orientation, and substantially maximized when said door is disposed in said substantially horizontal orientation, thereby minimizing said torque output required to move said door from said substantially vertical orientation to said substantially horizontal orientation.

5. The system of claim 4, wherein said optimum position is a point substantially laterally spaced apart from said axis of rotation a distance substantially equal to a height of said door, said take-up attachment further residing proximate said point.

6. The system of claim 2, wherein said take-up attachment includes a rotatable hub having an axis of rotation parallel to the axis of rotation of the door.

7. The system of claim 1, wherein said actuating device includes a filter means for actuating said motor in response to a user positioned proximate said door.

8. The system of claim 7, wherein said filter means includes:

an emitter;

an emitted pulse set emitted from said emitter, said emitted pulse set having characteristics and being reflectable off an object in the form of a reflected pulse set having characteristics;

a receiver for receiving said reflected pulse set; and a processor for comparing said emitted pulse set to said reflected pulse set, and initiating an action when the characteristics of said reflected pulse set correspond in to a selected portion of the characteristics of the emitted pulse set.

9. The system of claim 8, wherein the characteristics of said emitted pulse set correspond to a predetermined number of individual pulses emitted throughout a predetermined period of time.

10. The system of claim 9, wherein the characteristics of said reflected pulse set are equal to the characteristics of said emitted pulse set.

11. The system of claim 9, wherein the characteristics of said reflected pulse set are less than the characteristics of said emitted pulse set.

12. The system of claim 1, further including control means for controlling the rate at which said door moves from said substantially horizontal orientation to said substantially vertical orientation when a sensor no longer senses an object proximate said door.

13. The system of claim 12, wherein said control means includes a capacitor for regulating the supply of current to said drive means.

14. A receptacle comprising:

a body;

an opening for accessing said body;

a door having an upper edge mounted by a hinge in said opening and residing in a normal and substantially vertical orientation, said door being movable about said hinge between said substantially vertical orientation and a substantially horizontal orientation;

drive means for moving said door between said substantially vertical orientation and said substantially horizontal orientation;

a moment arm of applied force about the axis of rotation, said moment arm being smallest when said door is disposed in said substantially vertical orientation, and continuously increasing as said door moves toward said substantially horizontal orientation; and an actuator device for actuating said drive means.

15. The receptacle of claim 14, wherein said drive means includes a motor having a take-up attachment and a torque output.

16. The receptacle of claim 15, further including a cord having an end coupled to said take-up attachment, and another end coupled proximate a lower edge of said door, said take-up attachment for taking up and letting out said cord for moving said door from said substantially vertical orientation to said substantially horizontal orientation respectively.

17. The receptacle of claim 16, wherein said moment arm defined as perpendicular line extending from said hinge to said cord, said moment arm being smallest when said door is disposed in said substantially vertical orientation, and substantially maximized when said door is disposed in said substantially horizontal orientation, thereby minimizing said torque output required to move said door from said substantially vertical orientation to said substantially horizontal orientation.

18. The receptacle of claim 17, wherein said drive means is positioned at a point substantially laterally spaced apart from said hinge a distance substantially equal to a height of the door, said take-up attachment further residing proximate said point.

19. The receptacle of claim 15, wherein said take-up attachment includes a rotatable hub having an axis of rotation parallel to the hinge of the door.

20. The receptacle of claim 14, further including a filter means for controlling the actuation of said drive means.

21. The receptacle of claim 20, wherein said filter means includes:

an emitter;

an emitted pulse set emitted from said emitter, said emitted pulse set having characteristics and being reflectable off an object in the form of a reflected pulse set having characteristics;

a receiver for receiving said reflected pulse set; and a processor for comparing said emitted pulse set to said reflected pulse set, and initiating an action when the characteristics of said reflected pulse set correspond in to a selected portion of the characteristics of the emitted pulse set.

22. The receptacle of claim 21, wherein the characteristics of said emitted pulse set correspond to a predetermined number of individual pulses emitted throughout a predetermined period of time.

23. The receptacle of claim 22, wherein the characteristics of said reflected pulse set are equal to the characteristics of said emitted pulse set.

24. The receptacle of claim 22, wherein the characteristics of said reflected pulse set are less than the characteristics of said emitted pulse set.

25. The receptacle of claim 14, further including control means for controlling the rate at which said door moves from said substantially horizontal orientation to said substantially vertical orientation when a sensor no longer senses an object proximate said door.

26. The receptacle of claim 25, wherein said control means includes a capacitor for regulating the supply of current to said drive means.

27. A receptacle comprising:

a body;

an opening for accessing said body;

a door having an upper edge mounted in said opening by a hinge and residing in a normal and substantially vertical orientation, said door being movable about said hinge between said substantially vertical orientation and a substantially horizontal orientation;

a motor having a take-up attachment spaced apart from said hinge proximate an optimum position for minimizing the amount of force necessary to move the door from said substantially vertical orientation to said substantially horizontal orientation;

an actuator device for actuating said motor;

a cord having an end coupled to said take-up attachment, and another end coupled proximate a lower edge of said door, said motor for actuating said take-up attachment in response to said actuator device for taking up and letting out said cord for moving said door between said substantially vertical orientation and said substantially horizontal orientation respectively; and a moment arm defined as perpendicular line extending from said hinge to said cord, said moment arm being smallest when said door is disposed in said substantially vertical orientation, and continuously increasing as said door is moved to said substantially horizontal orientation, thereby minimizing a torque output required to move said door from said substantially vertical orientation to said substantially horizontal orientation.

28. The receptacle of claim 27, wherein said optimum position is a point substantially laterally spaced apart from said hinge a distance substantially equal to a height of the door, said take-up attachment further residing proximate said point.

29. The receptacle of claim 27, further including a filter means for controlling the actuation of said motor.

30. The receptacle of claim 29, wherein said filter means includes:

an emitter;

an emitted pulse set emitted from said emitter, said emitted pulse set having characteristics and being reflectable off an object in the form of a reflected pulse set having characteristics;

a receiver for receiving said reflected pulse set; and a processor for comparing said emitted pulse set to said reflected pulse set, and initiating an action when the characteristics of said reflected pulse set correspond in to a selected portion of the characteristics of the emitted pulse set.

31. The receptacle claim 30, wherein the characteristics of said emitted pulse set correspond to a predetermined number of individual pulses emitted throughout a predetermined period of time.

32. The receptacle of claim 31, wherein the characteristics of said reflected pulse set are equal to the characteristics of said emitted pulse set.

33. The receptacle of claim 31, wherein the characteristics of said reflected pulse set are less than the characteristics of said emitted pulse set.

34. The receptacle of claim 27, further including a control means for controlling the rate at which said door moves from said substantially horizontal orientation to said substantially vertical orientation when a sensor no longer senses an object proximate said door.

35. The receptacle of claim 34, wherein said control means includes a capacitor for regulating the supply of current to said motor.

36. The receptacle of claim 27, wherein said take-up attachment includes a rotatable hub.

* * * * *